US012073992B2

(12) United States Patent
Chorley et al.

(10) Patent No.: US 12,073,992 B2
(45) Date of Patent: Aug. 27, 2024

(54) CURRENT LEADS FOR SUPERCONDUCTING MAGNETS

(71) Applicant: Siemens Healthcare Limited, Camberley (GB)

(72) Inventors: Simon Chorley, Oxford (GB); Adam Paul Johnstone, Oxfordshire (GB)

(73) Assignee: Siemens Healthcare Limited, Camberley (GB)

( * ) Notice: Subject to any disclaimer, the term of this patent is extended or adjusted under 35 U.S.C. 154(b) by 0 days.

(21) Appl. No.: 17/632,142

(22) PCT Filed: Jul. 16, 2020

(86) PCT No.: PCT/EP2020/070210
§ 371 (c)(1),
(2) Date: Feb. 1, 2022

(87) PCT Pub. No.: WO2021/043486
PCT Pub. Date: Mar. 11, 2021

(65) Prior Publication Data

US 2024/0096535 A1 Mar. 21, 2024

(30) Foreign Application Priority Data

Sep. 4, 2019 (GB) ..................................... 1912698

(51) Int. Cl.
*H01F 6/04* (2006.01)
*H01F 6/06* (2006.01)

(52) U.S. Cl.
CPC ............... *H01F 6/065* (2013.01); *H01F 6/04* (2013.01)

(58) Field of Classification Search
CPC .. H01F 6/065; H01F 6/04; H01F 6/02; H02H 7/001
(Continued)

(56) References Cited

U.S. PATENT DOCUMENTS 3,108,444 A * 10/1963 Kahn ...................... F25B 21/00 62/3.1
3,711,744 A 1/1973 Luton, Jr.
(Continued)

FOREIGN PATENT DOCUMENTS

CN 103839649 A 6/2014
CN 107068329 A 8/2017
(Continued)

OTHER PUBLICATIONS

PCT International Search Report dated Oct. 20, 2020, Application No. PCT/EP2020/070210.

*Primary Examiner* — Shawki S Ismail
*Assistant Examiner* — Lisa N Homza
(74) *Attorney, Agent, or Firm* — Banner & Witcoff Ltd.

(57) ABSTRACT

A current lead arrangement for supplying current to a superconducting magnet coil, comprising a current lead and a cryogenic refrigerator. The current lead comprises a first section of low temperature superconductor (LTS) wire, joined to a second section of a high temperature superconductor (HTS) material, in turn joined to a third section of a resistive material. The cryogenic refrigerator comprises a first cooling stage and a second cooling stage. A lower end of the third section and an upper end of the second section are thermally linked to the first cooling stage, a lower end of the first section is thermally and electrically connected to the superconducting magnet coil.

2 Claims, 2 Drawing Sheets

Figure 1:
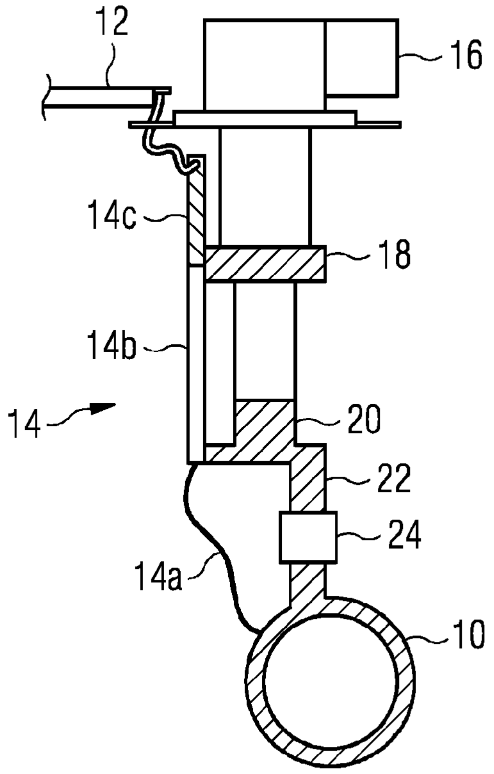

(58) Field of Classification Search
USPC .......................................................... 335/216
See application file for complete search history.

(56) References Cited

U.S. PATENT DOCUMENTS 4,107,935 A * 8/1978 Steyert, Jr. ................ F25B 9/00 505/891
4,136,525 A * 1/1979 Van Vechten ............ G21K 1/16 505/891
4,332,135 A * 6/1982 Barclay ................... F25B 21/00 505/894
4,464,903 A * 8/1984 Nakagome .............. F28D 15/06 505/891
4,486,800 A * 12/1984 Franksen .................. H01F 6/02 327/527
4,507,927 A * 4/1985 Barclay ................... F25B 21/00 505/891
4,509,334 A * 4/1985 Nakagome .............. F25B 21/00 62/3.1
4,642,994 A * 2/1987 Barclay ................... F25B 21/00 62/3.3
4,702,090 A * 10/1987 Barclay ................... F25B 21/00 62/3.6
4,704,871 A * 11/1987 Barclay ................... F25B 21/00 62/3.1
4,727,721 A * 3/1988 Peschka .................. F25B 21/00 62/3.1
4,785,636 A * 11/1988 Hakuraku ............... F25B 21/00 62/3.3
4,956,976 A * 9/1990 Kral ........................ F25B 21/00 62/3.1
5,024,059 A * 6/1991 Noble ................... F04D 23/001 62/3.1
5,182,914 A * 2/1993 Barclay ................... F25B 21/00 505/894
5,590,536 A * 1/1997 Wu ......................... H01F 6/065 62/51.1
5,686,876 A * 11/1997 Yamamoto .............. H01F 6/065 335/216
5,737,927 A * 4/1998 Takahashi ................. H01F 6/04 62/51.1
6,081,179 A 6/2000 Kato
6,112,530 A * 9/2000 Tench ................... F25D 19/006 62/50.7
6,532,748 B1 * 3/2003 Yuan ....................... F25B 9/145 165/4
6,865,897 B2 * 3/2005 Jibb ...................... F25B 23/006 62/51.1
7,323,963 B2 * 1/2008 Nemoto ............. G01R 33/3815 62/51.1
8,352,002 B2 * 1/2013 Kawashima .............. H01F 6/04 505/894
10,451,529 B2 * 10/2019 Schreibeis ............ F25D 19/006
2010/0113282 A1 5/2010 Kawashima

FOREIGN PATENT DOCUMENTS

JP H07131079 A 5/1995
JP H07142242 A 6/1995
JP H07297455 A 11/1995
JP H0878737 A 3/1996
JP H09312210 A 12/1997
JP 2006324325 A 11/2006
JP 2009270736 A 11/2009
JP 2013207018 A 10/2013
WO 9711472 A1 3/1997

* cited by examiner

CURRENT LEADS FOR SUPERCONDUCTING MAGNETS

CROSS-REFERENCE TO RELATED APPLICATIONS

The present application is a national stage entry of PCT application no. PCT/EP2020/070210, filed on Jul. 16, 2020, which claims the benefit of the filing date of Great Britain patent application no. GB 1912698.6, filed on Sep. 4, 2019, the contents of each of which are incorporated herein by reference in their entireties.

TECHNICAL FIELD

The present disclosure relates to superconducting magnets, and in particular to current leads for carrying electrical current between a superconducting magnet and a current source which is itself at room temperature.

BACKGROUND

Presently-known superconducting materials are commonly divided into "Low Temperature Superconductors" (LTS), which have a superconducting transition temperature below about 20K, and "High Temperature Superconductors" (HTS), which have a superconducting transition temperature above about 20K.

The present disclosure particularly relates to superconducting magnets comprising coils of superconducting wire having LTS core, but the present disclosure could be adapted for use with superconducting magnets comprising coils of superconducting wire having HTS core. Typically, both superconducting wire having LTS core and superconducting wire having HTS core both have a copper or aluminium stabiliser, and could benefit from application of the present disclosure.

SUMMARY

FIG. 1 schematically represents a conventional arrangement of cooling a superconducting magnet coil and providing electrical current connection to and from the magnet coil. As illustrated in FIG. 1, magnet coil 10, composed of a coil of superconducting wire, itself comprising one or more superconducting filaments in a non-superconducting metal matrix, such as copper or aluminium, is connected to an electrical conductor 12 by a current lead 14. Current lead 14 comprises a first section 14*a* of LTS superconductor, a second section 14*b* of HTS superconductor and a third section 14*c* of non-superconducting conductor such as copper, brass or aluminium. Typically, two such current lead arrangements will be provided, one to supply electrical current to the magnet coil 10 and one to provide a return path for the current to an electrical current supply, not illustrated, but only one current lead arrangement is shown, for ease of representation. The LTS section 14*a* typically comprises a superconducting wire, having stabilising matrix of copper or aluminium, within which a number of superconducting cores are provided.

The superconducting magnet coil 10 is cooled by refrigerator 16. Refrigerator 16 has a first cooling stage 18 which cools to a first cryogenic temperature, typically in the region of 25K-80K, and also has a second cooling stage 20 which cools to a second cryogenic temperature, typically approximately 4K. The first cooling stage typically cools a thermal radiation shield within a cryostat, and the second cooling stage typically cools the superconducting magnet coil 10 to operating temperature.

Accordingly, in operation, third section 14*c* of the current lead 14 extends between room temperature at about 300K to the first cryogenic temperature of 25K-80K. The rate of heat transfer through the third section 14*c* of the current lead 14 will be determined by the material, length and cross-sectional area of the third section, and the temperature difference between its two extremities.

In operation, second section 14*b* of the current lead 14 extends between the first cryogenic temperature of 25K-80K and the second cryogenic temperature of approximately 4K. The rate of heat transfer through the second section 14*b* of the current lead 14 will be determined by the material, length and cross-sectional area of the second section, and the temperature difference between its two extremities.

In operation, first section 14*a* of the current lead 14 extends between second cooling stage 20 which is at second cryogenic temperature of approximately 4K, and the magnet coil 10 which is also at approximately 4K. The rate of heat transfer through the first section 14*a* of the current lead 14 will be determined by the material, length and cross-sectional area of the third section, but should be minimal as there should be very little temperature difference between its two extremities.

A solid or fluid thermal link 22 of a conductive material such as high purity aluminium or high purity copper, or a thermosiphon, or a combination thereof thermally links second cooling stage to the magnet coil 10. Preferably, and as illustrated, a heat switch 24 may be placed in the thermal path between the second cooling stage 20 and the magnet coil 10. Examples of suitable heat switches 24 include a thermosyphon, a heat pipe, gas gap, solid (e.g. magnetoresistive), or mechanical switch.

HTS current leads, such as second section 14*b* of current lead 14, are required for low-cryogen and "dry" (no liquid cryogen bath) superconducting magnet systems, so that electrical current can be transferred into and from the superconducting magnet with minimal dissipation. As described above, and typically, the top of the HTS section 14*b* is thermally anchored by a high thermal conductivity link to the first cooling stage 18 of the cryogenic refrigerator 16, while the lower end of the HTS section is thermally anchored by a high thermal conductivity link to the second cooling stage 20 of the cryogenic refrigerator 16. The lower end of the HTS section is also thermally linked to the magnet coil 10 by a high electrical conductivity section 14*a*, which is typically of LTS wire.

Heat flowing through the third section 14*c* of current lead 14 from the electrical conductor 12 at room temperature, is intercepted and removed by the first cooling stage 18 of the refrigerator 16.

Heat flowing down the second section 14*b* of current lead 14 from the first cooling stage of the refrigerator 18 at 25-80K is intercepted and removed by the second cooling stage 20 of the refrigerator 16.

In the case of refrigerator 16 failure, the second cooling stage 20 of the refrigerator will warm rapidly, as materials have low heat capacity at the operating temperature of the second stage. With the refrigerator 16 inoperative for any reason, heat from the room-temperature end will be conducted through the material of the refrigerator to the second cooling stage 20 of the refrigerator. Although, in case of a refrigerator failure, heat switch 24 preferably blocks thermal conduction from second cooling stage 20 to the magnet coil 10 through the thermal link 22, heat will still be conducted through the first section 14*a*, the LTS part, of the current lead 14, from second cooling stage 20 to magnet coil 10. First cooling stage 18 of the refrigerator will also warm significantly, and heat from this first cooling stage 18 will be conducted down through the HTS section 14*b* of the current lead 14 to LTS section, first section 14*a* of the current lead 14, and thence to the magnet coil 10. Typically, an LTS wire such as may be used for LTS section 14*a* of the current lead 14 includes a number of superconductor filaments of small cross-section and a stabilising matrix material such as aluminium or copper, of significantly larger cross-section, and having an appreciable thermal conductivity. These flows of heat to the magnet coil 10 will cause a quench, which leads to a lengthy down-time of the superconducting magnet since the magnet coil 10 will have to be re-cooled before electrical current can be introduced, and heat transfer at such low temperatures tends to be inefficient.

Conventional approaches to avoid such magnet quench in the case of refrigerator failure include:

Provision of a back-up power supply and cooling water can be used to overcome the effects of a services failure and keep the refrigerator operational. Such arrangements are expensive, however, as a large uninterruptable power supply or generator is required, along with backup water chiller or air-cooled compressor.

Heat capacity may be added to the magnet coil 10, to limit the temperature rise in response to a given heat influx. Example arrangements may employ a liquid cryogen such as helium, solids with high heat capacity, such as rare earth metals, or larger masses of more common materials such as copper. However, such materials may be very expensive, and a large mass may be required in order to make a significant change to the heat capacity of the magnet coil 10.

For small magnet systems, one may simply accept that the superconducting magnet coil will quench in a matter of minutes after the refrigerator ceases to operate. For small magnets that re-cool in a few hours, and/or in cases where user up-time is not critical, this may be found acceptable. For whole-body MRI systems, where up times of 99% or better are expected, and where re-cool time may be 0.5-2.0 days or longer, such attitude will not be acceptable.

The following documents provide examples of conventional arrangements:

JP H07 142242 A (TOSHIBA CORP) 2 Jun. 1995 (1995-06-02)

JP H08 78737 A (MITSUBISHI ELECTRIC CORP) 22 Mar. 1996 (1996-03-22)

CN 107 068 329 A (HANGZHOU TURUI TECH CO LTD) 18 Aug. 2017 (2017-08-18)

JP H09 312210 A (TOSHIBA CORP) 2 Dec. 1997 (1997-12-02)

JP 2013 207018 A (TOSHIBA CORP) 7 Oct. 2013 (2013-10-07)

U.S. Pat. No. 5,686,876 A (YAMAMOTO KAZUTAKA [JP] ET AL) 11 Nov. 1997 (1997-11-11)

WO 97/11472 A1 (HITACHI LTD [JP]; SAHO NORIHIDE [JP] ET AL.) 27 Mar. 1997 (1997-03-27).

The present disclosure accordingly provides improved current leads for superconducting magnets which reduce thermal influx to superconducting magnet coils in case of refrigerator malfunction.

The present disclosure provides apparatus as defined in the appended claims.

DESCRIPTION OF THE ACCOMPANYING DRAWINGS

Figure 2:
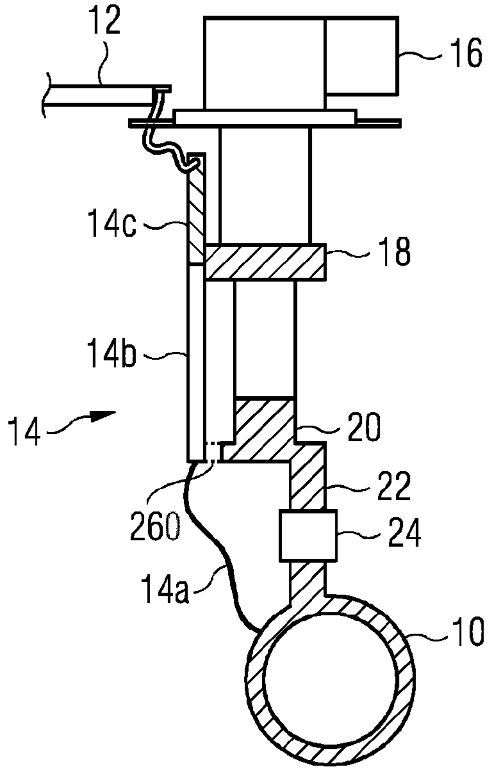
Figure 3:
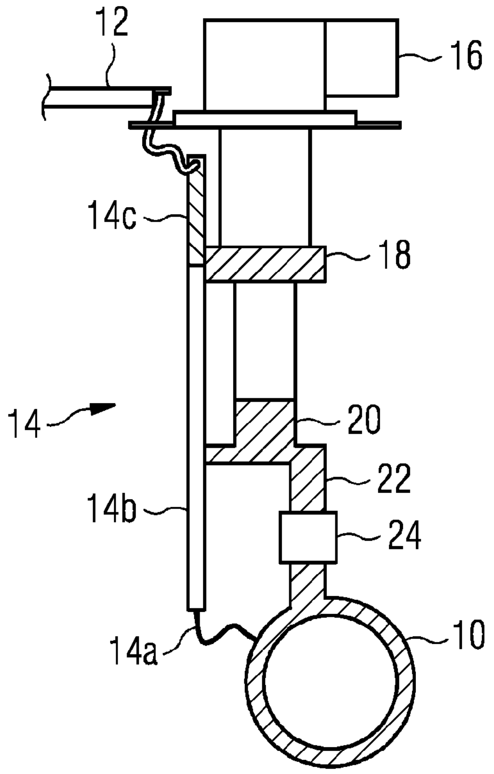
Figure 4:
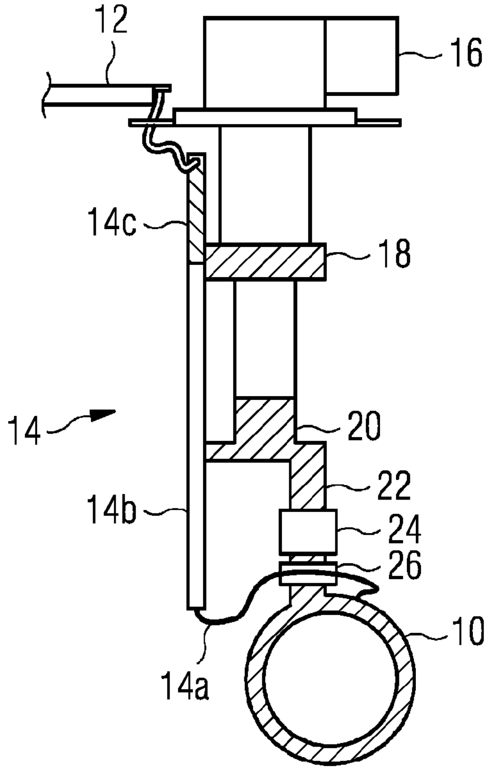

The above, and further, objects, characteristics and advantages of the present disclosure will become more apparent from the following description of certain embodiments, given by way of non-limiting examples, in conjunction with the accompanying drawings, wherein:

FIG. 1 schematically represents a conventional arrangement for supplying current to a superconducting coil;

FIG. 2 schematically represents an arrangement for supplying current to a superconducting coil, according to a first embodiment of the present disclosure;

FIG. 3 schematically represents an arrangement for supplying current to a superconducting coil, according to a second embodiment of the present disclosure; and FIG. 4 schematically represents an arrangement for supplying current to a superconducting coil, according to a third embodiment of the present disclosure.

DETAILED DESCRIPTION

According to the present disclosure, alternative arrangements are provided for supplying current to magnet coil 10, and correspondingly providing a return path for the current from the magnet coil 10.

FIGS. 2-3 illustrate alternative embodiments of the present disclosure. The present disclosure provides such arrangements in which no low-resistance thermal path is provided between the second cooling stage 20 of the refrigerator and the superconducting magnet coil 10. Features of FIGS. 2-3 which are in common with the arrangement of FIG. 1 carry corresponding reference numerals.

In the embodiments of FIGS. 2-3, and for the arrangement of FIG. 1, typically two similar current leads will be provided: one to supply current to the magnet coil 10 and one to provide a return path for the current from the magnet coil 10. However, in each case, only one current lead is shown for ease of illustration.

In the embodiment of FIG. 2, there is no thermal link between the second cooling stage 20 and the current lead 14. Current lead 14 still comprises a first LTS section 14*a*, a second HTS section 14*b* and a third non-superconductive section 14*c*. In the conventional arrangement of FIG. 1, a lower end of the second HTS section 14*b* and an upper end of the first LTS section 14*a* are thermally linked to the second cooling stage 20. In the embodiment of FIG. 2, there is no thermal link between the current lead 14 and the second cooling stage 20 of the refrigerator. As schematically illustrated, this may be simply achieved by mechanically detaching the current lead 14 from the second cooling stage 20. Alternatively, a solid thermal insulator material 260 may be provided between the current lead 14 and the second cooling stage 20, to provide mechanical support to the current lead 14 without allowing heat from the second cooling stage to be transferred to the current lead. Suitable materials to use may be selected from among the list: plastics such as nylon, PTFE, polyester; composites such as GRP, carbon fibre reinforced plastic, G10, Durastone, cotton phenolic; small cross-section stainless steel.

In an example embodiment, the first LTS section 14*a* includes superconducting filaments of NbTi, which remains superconducting at temperatures up to about 8K at typical currents and background fields. In the absence of a thermal link to the second cooling stage 20, it may be necessary to increase the thermal conductance of the first LTS section 14*a* of the current lead 14, as the LTS section 14*a* is, in use, cooled to a superconducting temperature—such as 8K or less—by conduction through its own length, then through the main magnet thermal bus, solid thermal link 22. This may be achieved by adding more material of high thermal conductivity such as aluminium or copper to the first LTS section 14*a* of the current lead 14. For example, a length of copper wire of desired cross-section may be soldered in parallel onto a copper-sheathed superconducting wire used for the first LTS section 14*a*. This copper wire may be in the form of extra lengths of the sheathed LTS wire. Alternatively, a superconductive wire of desired copper or aluminium sheathing dimension may be used for the first LTS section 14*a*.

In operation of the magnet coil 10, no current flows in current lead 14. Current lead 14 reaches a thermal equilibrium determined by the temperatures of the first cooling stage 18, the temperature of the second cooling stage 20 and the thermal resistance of the main magnet thermal bus, solid thermal link 22 and the magnet coil 10.

In case of failure of the refrigerator 16, heat conducted from room temperature through the refrigerator 16 to the second cooling stage 20 can only flow to magnet coil 10 through the main magnet thermal bus, solid thermal link 22. If, as is preferred, heat switch 24 is provided in the solid thermal link 22, this can be opened in case of refrigerator failure to prevent heat transfer from the second cooling stage 22 to the magnet coil 10. There will accordingly be no thermal path from the second cooling stage 20 to the magnet coil 10 or the first LTS section 14*a* of the current lead 14. Heat transfer from the first stage 18 does not significantly heat either the magnet coil 10 or the LTS first section 14*a* of the current lead 14 because HTS material of second HTS section 14*b* of the current lead 14 has a high thermal resistance.

In the embodiment of FIG. 3, the second HTS section 14*b* of the current lead 14 is extended beyond the second cooling stage 20. The thermal link between second cooling stage 20 and current lead 14 is maintained, corresponding to the conventional arrangement of FIG. 1, but in the embodiment of FIG. 3, the thermal link between the second cooling stage 20 and the current lead 14 is made part-way along the second HTS section 14*b*. Due to the high thermal resistivity of the HTS material, the lower end of the second HTS section 14*b* and the upper end of the first section 14*a* are thermally isolated from the second cooling stage 20 by a significant thermal resistance.

In operation of the superconducting magnet, no current flows through current lead 14, heat switch 24, if present, is closed, and the magnet coil 10 and first LTS section 14*a* of the current lead 14 are cooled to LTS superconducting temperature by the second cooling stage 20 by thermal conduction through main magnet thermal bus, solid thermal link 22.

In case of refrigerator failure, heat switch 24 may be opened, if present. No heat will then flow from second cooling stage 20 to magnet coil 10 through main magnet thermal bus, solid thermal link 22. Although heat will be carried through the structure of refrigerator 16 to second cooling stage 20, and accordingly to the current lead 14, the heat from the second cooling stage 20 will reach the current lead 14 part-way along the second HTS section of the current lead. As the HTS material of second HTS section 14*b* of the current lead has a relatively low thermal conductivity, very little of the heat reaching the second cooling stage 20 will transfer to the current lead 14. Accordingly, very little of the heat reaching the second cooling stage 20 will transfer to the magnet coil 10 or the first LTS stage 14*a* of current lead 14. Heat transfer to the magnet coil 10 or the first LTS stage 14*a* of current lead 14 is reduced as compared to the conventional arrangement of FIG. 1. An advantage of this embodiment is in that, in operation, heat influx reaching the second HTS section 14*b* through first cooling stage 18 is extracted from the current lead 14 at the second cooling stage 20. Therefore, there is no need to make the first LTS section 14*a* highly thermally conductive, as is the case in the embodiment of FIG. 2. The wire of the first LTS section 14*a* therefore may remain relatively thin and easy to handle. On the other hand, the added consumption of HTS material will add material costs as compared to the embodiment of FIG. 2.

An example advantage of the present disclosure is that the disclosure allows the magnet to stay at field during a cooling failure for an extended period of time, known as a “ride-through” period, as compared to conventional arrangements which do not benefit from the present disclosure. In certain embodiments, and preferably, this advantage allows the magnet to remain superconducting and at field until cooling is restored.

Another example advantage of the present disclosure is in that the first, LTS section 14*a* remains in a superconducting state during this extended period of time so the magnet can be ramped down by orderly removal of current from the magnet coils towards the end of the ride-through period, thereby to avoid a quench. In corresponding preferred embodiments, the superconducting magnet may remain superconducting while ramping down even when the refrigerator 16 is inoperative. Because the first LTS section 14*a* of the current lead 14 is not thermally attached to the cold-head second cooling stage 20, the upper end of first LTS section 14*a* of the current lead 14 maintains a temperature below the superconducting transition temperature, which may for example be 8K, for an extended period of time after the refrigerator 16 ceases to operate. This allows the magnet to be ramped down by orderly removal of current from the magnet coils in a controlled fashion, thereby extracting stored energy and avoiding a quench, meaning the magnet will re-cool and be ready to be ramped back to field much sooner after the cooling is restored than would be the case following a quench.

Example materials for the first, LTS section 14*a* of the current lead 14 include LTS superconductor of niobium titanium or triniobium tin $Nb_3Sn$, with matrix material of copper or aluminium. Suitable dimensions include any appropriate length/cross-sectional area ratio. In a specific embodiment, the LTS section may be about 0.7 m long and with a 45 $mm^2$ cross-sectional area.

Example materials for the second, HTS section 14*b* of the current lead 14 include 1G or 2G HTS tape such as BSCCO, Rare-earth BCO (YBCO, GdBCO) may be used, preferably without copper matrix material.

Example materials for the third, non-superconductive 14*c* of the current lead 14 include brass or copper or a combination thereof. Stainless steel may also be used, but may require a larger cross-sectional area due to its resistivity. In accordance with the present disclosure, the low-thermal-resistance thermal link between the second cooling stage 20 and the first LTS section of current lead 14 and magnet coil 10 is removed and is replaced by a link of high thermal resistance. The high thermal resistance may be provided by a length of second HTS section 14*b* of the current lead 14, or may be provided by thermal, or thermal and mechanical, detachment of the current lead 14 from the second cooling stage 20 as provided in the embodiments of FIG. 3 and FIG. 2, respectively.

In a further embodiment of the disclosure, as illustrated in FIG. 4, a thermal dump 26 is provided, in thermal contact with first, LTS section 14*a* of current lead 14 and with thermal link 22. Thermal dump 26 is electrically isolated from either or both of the first, LTS section 14*a* of current lead 14 and thermal link 22. The thermal dump 26 intercepts the heat flowing down LTS section 14*a* in normal operation, so that it flows directly into the thermal link 22 back to the refrigerator second stage 20, rather than via the magnet 10. This increases the thermal margin of the coil 10 because its temperature will be lower if it is not transferring heat. In an example, first, LTS section 14*a* of current lead 14 is soldered to thermal dump 26 in the form of a copper block. The copper block, thermal dump 26, is bonded to thermal link 22 over a large area with a thin electrically insulating adhesive layer.

The invention claimed is:

1. A current lead arrangement for supplying current to a superconducting magnet coil, comprising:

a current lead comprising a first section of low temperature superconductor (LTS) wire joined to a second section of a high temperature superconductor (HTS) material, which is in turn joined to a third section of a resistive material, wherein each of the first section, the second section, and the third section is configured to extend, in that order, upward and away from the superconducting magnet coil;

a cryogenic refrigerator comprising a first cooling stage and a second cooling stage, the first cooling stage being located above the second cooling stage, wherein a lower end of the third section and an upper end of the second section are thermally linked to the first cooling stage, wherein a lower end of the first section is configured to be thermally and electrically connected to the superconducting magnet coil; and a first thermal link thermally in contact with the second cooling stage and configured to be thermally in contact with the superconducting magnet coil, the first thermal link being provided with a heat switch to interrupt a thermal conductivity of the first thermal link, wherein the second section extends downwards beyond the second cooling stage and is thermally linked to the second cooling stage by a second thermal link provided partially along the second section of the high temperature superconductor, and wherein a lower end of the second section and an upper end of the first section are thermally isolated from the second cooling stage by an intermediate portion of the second section, which is located between the lower end of the second section and the second thermal link.

2. An arrangement according to claim 1, further comprising:

a copper block in thermal contact with the second cooling stage and the first section, the copper block being electrically isolated from either or both of the first section and the first thermal link.

* * * * *